(12) United States Patent
Wittorff

(10) Patent No.: US 8,130,652 B2
(45) Date of Patent: Mar. 6, 2012

(54) CONTROL OF DATA IN COMMUNICATION NETWORKS

(75) Inventor: Vaughan William Wittorff, Cambridge (GB)

(73) Assignee: Complex Systems Research Limited, Cambridge (GB)

( * ) Notice: Subject to any disclaimer, the term of this patent is extended or adjusted under 35 U.S.C. 154(b) by 218 days.

(21) Appl. No.: 12/524,546

(22) PCT Filed: Jan. 24, 2008

(86) PCT No.: PCT/AU2008/000079
§ 371 (c)(1),
(2), (4) Date: Jul. 24, 2009

(87) PCT Pub. No.: WO2008/089514
PCT Pub. Date: Jul. 31, 2008

(65) Prior Publication Data
US 2010/0054271 A1 Mar. 4, 2010

(30) Foreign Application Priority Data
Jan. 24, 2007 (AU) .............................. 2007900313

(51) Int. Cl.
*H04L 12/26* (2006.01)
*H04L 12/56* (2006.01)
(52) U.S. Cl. ................... 370/235; 370/401; 370/412
(58) Field of Classification Search ........................ None
See application file for complete search history.

(56) References Cited

U.S. PATENT DOCUMENTS

| | | | |
|---|---|---|---|
| 5,493,566 A * | 2/1996 | Ljungberg et al. ............ 370/231 |
| 6,411,627 B1 | 6/2002 | Hullett et al. | |
| 6,674,718 B1 * | 1/2004 | Heddes et al. ................ 370/230 |
| 6,721,273 B1 | 4/2004 | Lyon | |
| 6,999,415 B2 * | 2/2006 | Luijten et al. ................. 370/230 |
| 7,532,584 B2 | 5/2009 | Wittorff | |
| 2002/0172205 A1 * | 11/2002 | Tagore-Brage et al. . 370/395.42 |
| 2003/0035374 A1 * | 2/2003 | Carter et al. ................... 370/235 |
| 2007/0217336 A1 * | 9/2007 | Sterne et al. .................. 370/235 |

* cited by examiner

*Primary Examiner* — Hong Cho

(57) ABSTRACT

A router (14) for use in a communication network (10) and an associated method. The router (14) includes input ports each having an associated input buffer for receiving data packets from a sending device and output ports for sending data packets to a receiving device. The router (14) also includes a means to direct data packets from the or each input port to one or more of the output ports and a means for providing information to each sending device such that a determination may be made as to whether or not the sending device may transmit packets in order to assure lossless transfer. The means to direct data packets from a particular input port includes a method of control in order to regulate the transfer of data packets, where this regulation is based on a count of the data packets previously transferred from that input port and not yet output from the output port. The router (14) transmits data packets from the output port only when loss free transfer to the input port of the receiving router (14) is assured.

16 Claims, 2 Drawing Sheets

CONTROL OF DATA IN COMMUNICATION NETWORKS

FIELD OF THE INVENTION

The present invention relates to a method and apparatus for controlling traffic flow in communication networks.

BACKGROUND TO THE INVENTION

The present invention comprises a form of aggregate control of traffic flow in networks. Such aggregate control methods lend themselves to use in connection-oriented networks and have been employed to some extent in such networks. However, due to the different nature of connectionless networks, such as networks subject to the Internet Protocol (IP), the ability of such methods to be successfully used in connectionless networks has not been readily apparent.

References to prior art in this specification are provided for illustrative purposes only and are not to be taken as an admission that such prior art is part of the common general knowledge in Australia or elsewhere.

SUMMARY OF THE INVENTION

In accordance with a first aspect of the present invention there is provided a switching device for use in a communication network comprising:
one or more input ports, each having an associated input buffer for receiving data packets from a sending device;
one or more output ports for sending data packets to a receiving device;
a means to direct data packets from the or each input port to one or more of the output ports; and
a means for providing information to the or each sending device such that a determination may be made as to whether or not the sending device may transmit packets in order to assure lossless transfer;
wherein the means to direct data packets from a particular input port includes a method of control in order to regulate the transfer of data packets, where this regulation is based on a count of the data packets previously transferred from that input port and not yet output from the output port, and the switching device transmits data packets from the output port only when loss free transfer to the receiving device is assured.

In accordance with a second aspect of the present invention there is provided a method of controlling flow of traffic in a communication network comprising one or more switching devices, each switching device having one or more input ports with an associated input buffer for receiving data packets from a sending device, one or more output ports for sending data packets to a receiving device and a means to direct data packets from the or each input port to one or more of the output ports; the method including the steps of:
the means to direct data packets regulating the transfer of data packets from one of the input ports, such regulation based on a count of the data packets previously transferred from that input port and not yet output from the or each output port;
the switching device providing information to the or each sending device such that a determination may be made as to whether or not the sending device may transmit packets in order to assure lossless transfer; and
the switching device transmitting data packets from the output port only when loss free transfer to the receiving device is assured.

Preferably, the method of control includes one or more control values each associated with a corresponding input port such that each control value defines the maximum number of data packets received from the corresponding input port still awaiting transfer by appropriate output ports.

In one embodiment, each input port includes an input buffer and further packets are not read from the buffer of an input port when the control value associated with the input port is exceeded.

The switching device preferably includes a means for providing information to the or each sending device connected to an input port regarding the available space in the input buffer. The sending device may comprise a sending switching device and the means for providing information regarding available space in the buffer comprises a credit based system such that the sending switching device maintains a count of credits which is decremented for each data packet sent and increased based on information transmitted to the sending switching device by said switching device.

In one embodiment, the count of credits is initially set to a value not exceeding the capacity of the input buffer of the switching device and the switching device sends information to the sending switching device to increment the count of credits each time a data packet is transferred from the input buffer.

In another embodiment, the count of credits is initially set to a value not exceeding the capacity of the input buffer of the switching device and the switching device sends information to the sending switching device to increase the count of credits by a pre-defined number each time that the pre-defined number of data packets are transferred from the input buffer.

In a further embodiment, the sending device comprises a sending end user and the switching device includes means to transmit a control signal to the sending end user to temporarily prevent further transmission of data.

Throughout the specification, unless the context requires otherwise, the word "comprise" or variations such as "comprises" or "comprising", will be understood to imply the inclusion of a stated integer or group of integers but not the exclusion of any other integer or group of integers. Likewise the word "preferably" or variations such as "preferred", will be understood to imply that a stated integer or group of integers is desirable but not essential to the working of the invention.

BRIEF DESCRIPTION OF THE DRAWINGS

The nature of the invention will be better understood from the following detailed description of preferred embodiments of the invention, given by way of example only, with reference to the accompanying drawings, in which.

DETAILED DESCRIPTION OF PREFERRED EMBODIMENTS

Figure 1:
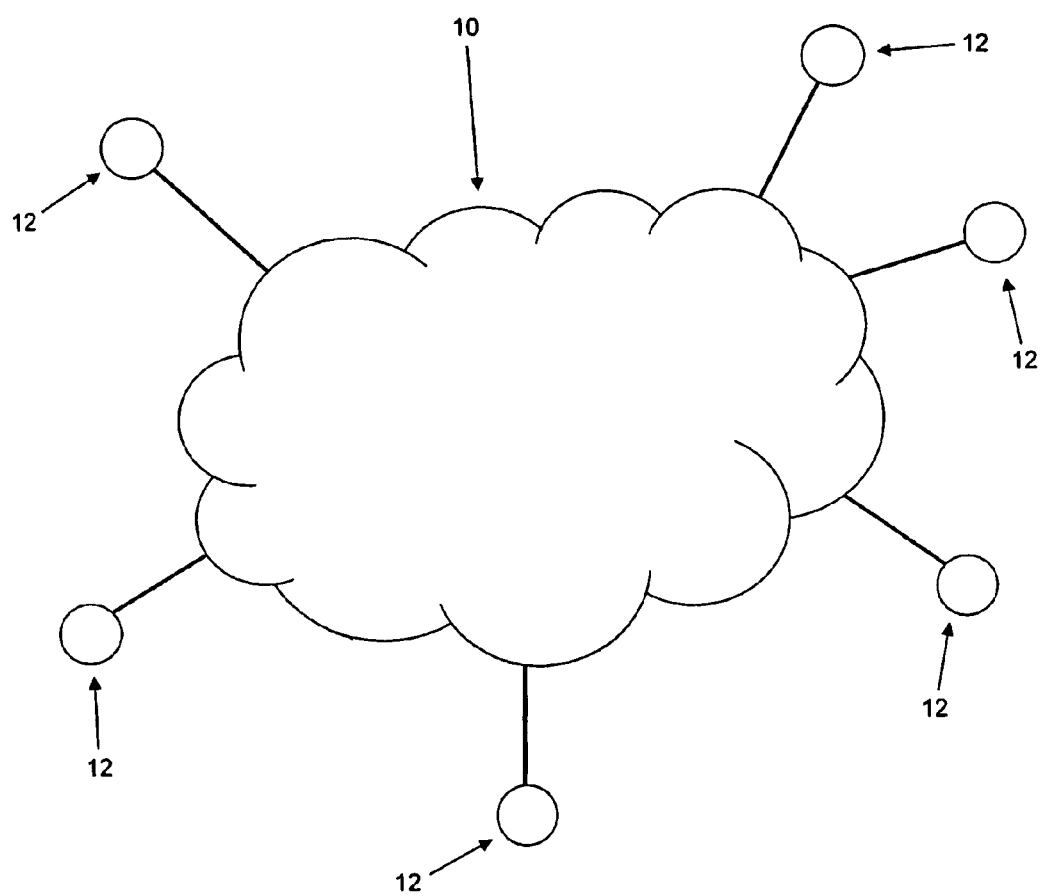
FIG. 1 is a schematic view of a communications network to which the present invention may be applied.

The present invention relates to a method of control of traffic flow in networks such as the Internet. The invention also relates to a switching device for use in such networks. The switching device may comprise a router or a switch.

The invention relates to a method of controlling traffic flow in a way that provides fairness during periods of congestion. A switching device in accordance with the invention includes one or more input ports and one or more output ports. Each of the input ports is connected, in use, by links to a sending device being either the output port of a sending switching device or a source end user. Each of the output ports is connected, in use, by links to a receiving device, being either the input port of a receiving switching device or a destination end user. It will be appreciated that the terms sending and receiving are used only for the purposes of illustrating transfer of a particular data packet. If the links are two-way links, then data transfer in the opposite direction is also possible.

The switching device includes a means to direct data packets from the input ports to the appropriate one or more of the output ports. The means to direct data packets includes a method of control to regulate the transfer of data packets. This regulation is based on a count of data packets previously transferred from an input port and not yet output from the output port. In one embodiment, the means to direct data packets includes one or more control values, each associated with a corresponding input port, wherein each control value defines the maximum allowable number of data packets received from the corresponding input port still awaiting transfer by the appropriate output port(s). The means to direct data packets exercises control in this case over the reading of data packets from the input ports in that further packets are not read when the corresponding control value is reached, and control is exercised until the count of packets awaiting transfer from the output port(s) decreases to below the control value.

Each of the input ports also includes an input buffer for storing received data packets. The switching device of the invention further includes means for providing information to the or each sending switching device or source end user indicating the availability of space in the corresponding input buffer, or otherwise informing the or each sending switching device or source end user whether or not it may transmit packets, in order to assure lossless transfer. The sending switching device or source end user then uses this information such that data packets are only sent to the input port of the switching device when they can and will be accepted into the input buffer of the input port, thereby assuring loss free transfer to the input port.

If the switching device provides information to the sending switching device or source end user about the available space in the input buffer, it may be by any suitable means. Such a means may comprise a credit based system, and explanation of which follows in the case of the input port receiving traffic from a sending switching device. The sending switching device will maintain for each output port a counter of credits starting initially with a number of credits equal to the (actual or defined) capacity (number of packets) of the input buffer of the corresponding input port of the switching device and these credits will count down each time a data packet is sent. The switching device will then transmit information back to the sending switching device when one or more data packets is transferred from the input buffer of the switching device to the appropriate output port to indicate to the sending switching device to increase the credit count. When the credits for sending to the switching device are at zero, the sending switching device does not send data packets to the switching device. At the instant in time that the credit counter contains zero credits, the corresponding input buffer may not be full due to the transmission delay of the link. In fact, at any instant the free space in the input buffer (F) will equal the sum of (i) the number of packets in transit being sent to the switching device (P), (ii) the credit count being maintained in the output port in the sending switching device (C), and (iii) the number of credit tokens in transit being returned to the sending switching device (T). So in the case when credits are exhausted and transmission ceases because lossless transfer cannot be guaranteed, we have F=P+T. The input buffer is therefore only ever full when credits are exhausted and simultaneously neither packets nor credit tokens are in transit.

In this way, using the control values to selectively transfer incoming data packets to the output ports within the switching device, together with the means to provide information to the sending switching device or source end user about the available space in the input buffer, the traffic flow through the network will be selectively throttled. If congestion occurs due to convergence of flows, such that data packets accumulate in a switching device awaiting transmission from a particular output port, the input port which is most responsible for the congestion will reach its associated control value first and the means to direct data packets will not read further data from that input port. The input buffer of that input port may fill, causing the sending switching device or source end user connected to that input port to halt further data transfer.

Figure 2:
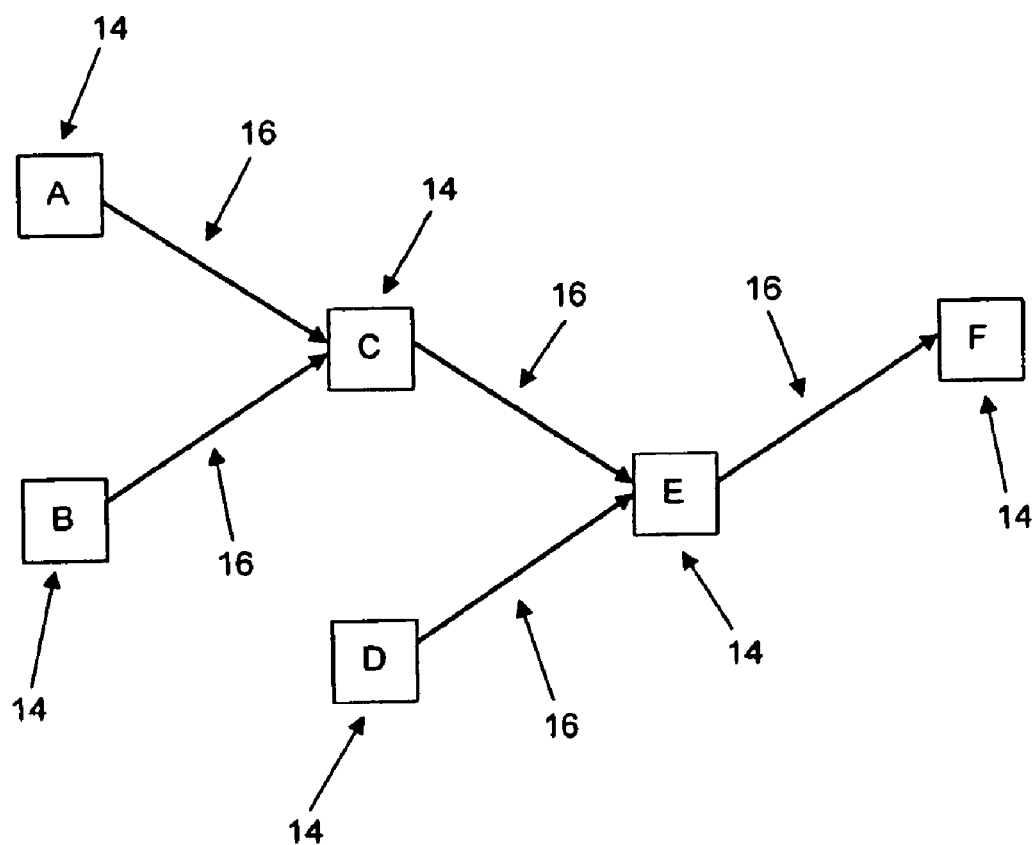
FIG. 2 is a schematic view of a transmission of data packets between a plurality of switching devices of the present invention.

FIG. 1 shows a schematic view of a connectionless network 10 to which are connected a plurality of end users 12. FIG. 2 shows an example of a portion of the network 10 comprising six switching devices 14 connected by transmission links 16 for the purpose of illustration of the invention. Consider a case in which traffic from switching devices A and B is aggregated at switching device C for transmission to switching device E but that the total traffic to switching device E does not exceed the capacity of the link to switching device E. Consider also that switching device D transmits data to switching device E but that the aggregated traffic from E to F again does not exceed the capacity of that link.

If traffic from switching device C directed to switching device E increases such that the combined traffic destined for switching device F would exceed the capacity of that link, if it were possible, then a backlog of data packets will accumulate in switching device E. Assuming the total traffic from switching device C is greater than that from switching device D, stored packets which have been read from the input port from switching device C will reach the control value first. Control will then be exercised in that further data packets will not be read from the input port from switching device C while the control value is exceeded.

If the congestion persists and the input buffer from switching device C fills, switching device C will halt sending further data to switching device E. If congestion further persists, the control values in switching device C for either switching device A or B (depending on which is contributing most to the congestion) may also be reached causing further packets from that switching device not to be read from the input port. In this way, the increased traffic is dealt with by selectively throttling traffic flow from those switching devices that are contributing most to the congestion.

Over a period of time, which may in practice be quite short, the number of packets awaiting transfer in the switching devices will fall below the control values allowing further reading of data packets from input buffers and the congestion will clear and the network will return to a state in which no flow control is being exercised on transmitted data.

It is also possible that, given sufficient congestion, the throttled connections may propagate back through the network to an end user 12. In this situation, the switching device to which that end user is connected will include a means to send a halt or control signal to the end user to temporarily prevent further transmission of data so as to assure lossless transfer to the finite sized buffer in the input port of the switching device. While control is being exercised in this fashion throughout a subsection of the network back to a source end user, various buffers will be oscillating between states of capacity and near-capacity, various input ports in various switching devices will be oscillating between states of being at their control values and just below them, and various output ports in those switching devices will be oscillating between states of credit exhaustion and near-exhaustion. This state of controlled local dynamic equilibrium will enable traffic to flow optimally, such that in some sense there is achieved simultaneously maximum network utilization and per-flow fairness.

It will be appreciated that the data packets subject to the invention as described above may be a subset of the total data packets in the communication network. The other data packets comprising one or more further classes of data packets may be transferred by the switching devices with a priority greater than that of the data packets subject to the invention and processed through separate queues in the invention.

It will be readily apparent to persons skilled in the relevant arts that various modifications and improvements may be made to the foregoing embodiments, in addition to those already described, without departing from the basic inventive concepts of the present invention. Therefore, it will be appreciated that the scope of the invention is not limited to the specific embodiments described and is to be determined from the appended claims.

The invention claimed is:

1. A switching device for use in a communication network comprising:
   one or more input ports, each having an associated input buffer for receiving data packets from a sending device;
   one or more output ports for sending data packets to a receiving device;
   a means to direct data packets from the or each input port to one or more of the output ports; and
   a means for providing information to the or each sending device such that a determination may be made as to whether or not the sending device may transmit packets in order to assure lossless transfer;
   wherein the means to direct data packets from a particular input port includes a method of control in order to regulate the transfer of data packets, where this regulation is based on a count of the data packets previously transferred from that input port and not yet output from the output port, and the switching device transmits data packets from the output port only when loss free transfer to the receiving device is assured.

2. A switching device in accordance with claim 1, wherein the method of control includes one or more control values each associated with a corresponding input port such that each control value defines the maximum number of data packets received from the corresponding input port still awaiting transfer by appropriate output ports.

3. A switching device in accordance with claim 2, wherein each input port includes an input buffer and further packets are not read from the buffer of an input port when the control value associated with the input port is exceeded.

4. A switching device in accordance with claim 3, wherein the switching device includes a means for providing information to the or each sending device connected to an input port regarding the available space in the input buffer.

5. A switching device in accordance with claim 4, wherein the sending device comprises a sending switching device and the means for providing information regarding available space in the buffer comprises a credit based system such that the sending switching device maintains a count of credits which is decremented for each data packet sent and increased based on information transmitted to the sending switching device by said switching device.

6. A switching device in accordance with claim 5, wherein the count of credits is initially set to a value not exceeding the capacity of the input buffer of the switching device and the switching device sends information to the sending switching device to increment the count of credits each time a data packet is transferred from the input buffer.

7. A switching device in accordance with claim 5, wherein the count of credits is initially set to a value not exceeding the capacity of the input buffer of the switching device and the switching device sends information to the sending switching device to increase the count of credits by a pre-defined number each time that the pre-defined number of data packets are transferred from the input buffer.

8. A switching device in accordance with claim 1, wherein the sending device comprises a sending end user and the switching device includes means to transmit a control signal to the sending end user to temporarily prevent further transmission of data.

9. A method of controlling flow of traffic in a communication network comprising one or more switching devices, each switching device having one or more input ports with an associated input buffer for receiving data packets from a sending device, one or more output ports for sending data packets to a receiving device, and a means to direct data packets from the or each input port to one or more of the output ports; the method including the steps of:
   the means to direct data packets regulating the transfer of data packets from one of the input ports, such regulation based on a count of the data packets previously transferred from that input port and not yet output from the or each output port;
   the switching device providing information to the or each sending device such that a determination may be made as to whether or not the sending device may transmit packets in order to assure lossless transfer; and
   the switching device transmitting data packets from the output port only when loss free transfer to the input port of the receiving device or destination end user is assured.

10. A method in accordance with claim 9, wherein the method of control includes one or more control values each associated with a corresponding input port such that each control value defines the maximum number of data packets received from the corresponding input port still awaiting transfer by appropriate output ports.

11. A method in accordance with claim 10, wherein each input port includes an input buffer and further packets are not read from the buffer of an input port when the control value associated with the input port is exceeded.

12. A method in accordance with claim 11, including the steps of the switching device providing information to the or each sending device connected to an input port regarding the available space in the input buffer.

13. A method in accordance with claim 12, wherein the sending device comprises a sending switching device and the sending switching device maintains a count of credits which is decremented for each data packet sent and increased based on information transmitted to the sending switching device by said switching device.

14. A method in accordance with claim 13, including the steps of initially setting the count of credits to a value not exceeding the capacity of the input buffer of the switching device and the switching device sending information to the sending switching device to increment the count of credits each time a data packet is transferred from the input buffer.

15. A method in accordance with claim 13, including the steps of initially setting the count of credits to a value not exceeding the capacity of the input buffer of the switching device and the switching device sending information to the sending switching device to increase the count of credits by a pre-defined number each time that the pre-defined number of data packets are transferred from the input buffer.

16. A method in accordance with claim 9, wherein the switching device transmits a control signal to the sending end user to temporarily prevent further transmission of data.

* * * * *